Feb. 1, 1966  M. K. RICHMOND  3,233,162
ROTARY SPEED-CHANGE-SENSING MECHANISM
Filed May 10, 1962  2 Sheets-Sheet 1
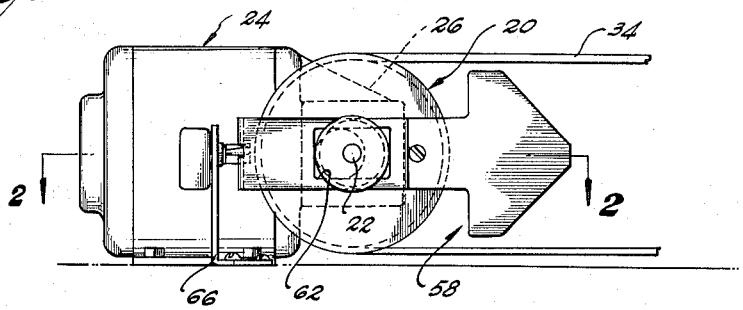
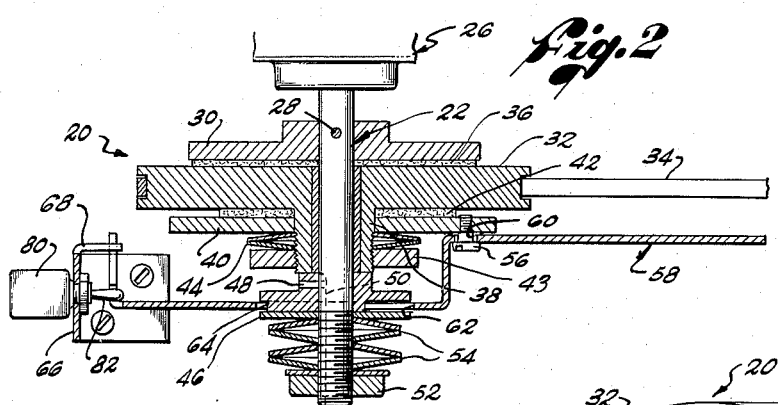
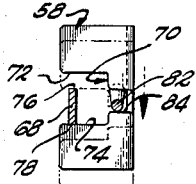
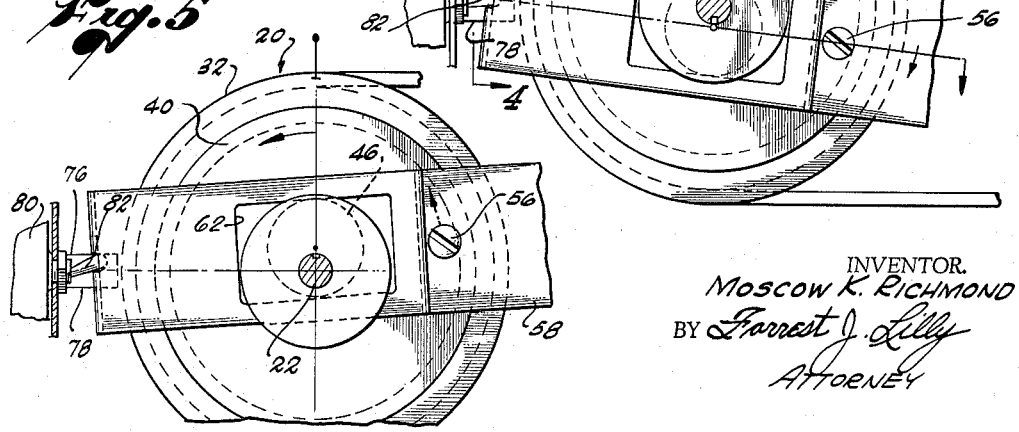
INVENTOR.
MOSCOW K. RICHMOND
BY Forrest J. Lilly
ATTORNEY

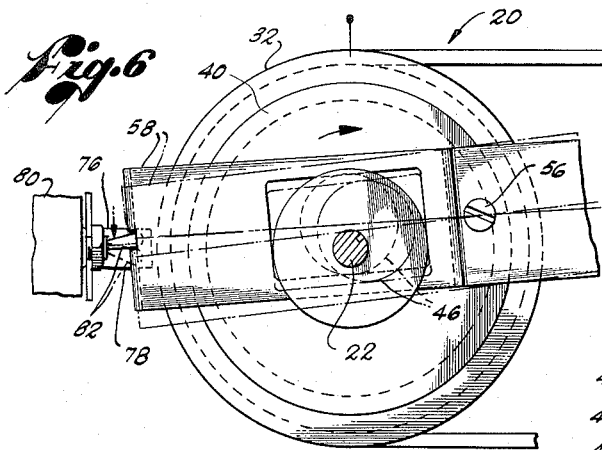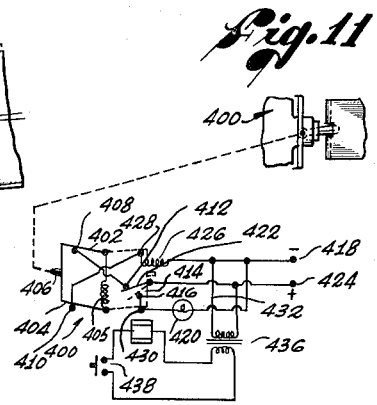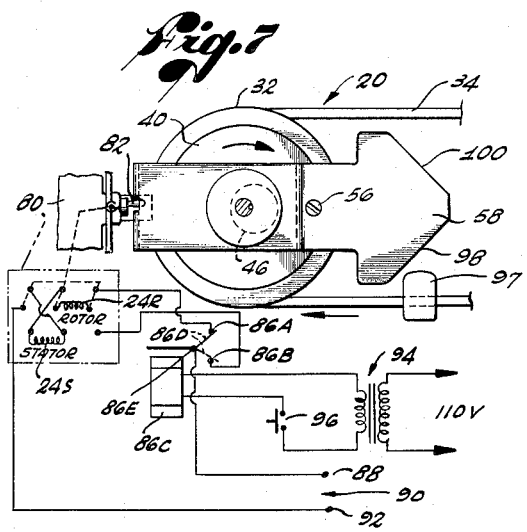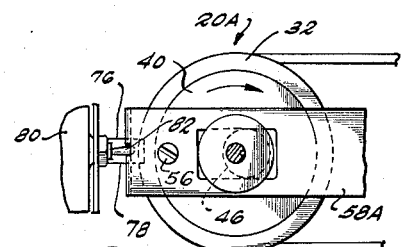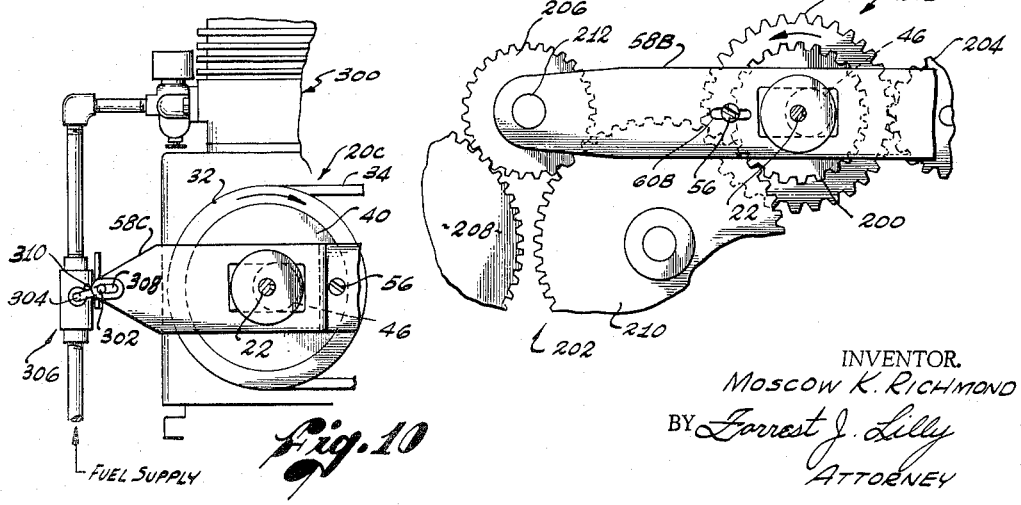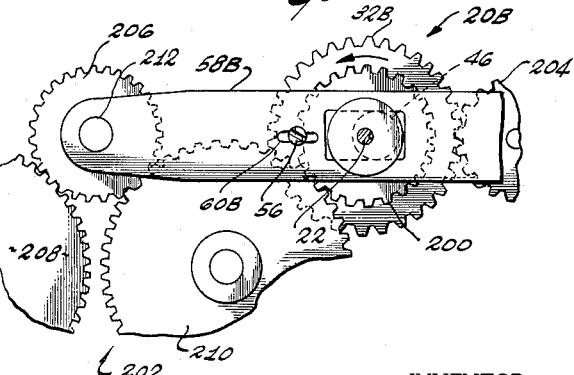

United States Patent Office 3,233,162
Patented Feb. 1, 1966

3,233,162
ROTARY SPEED-CHANGE-SENSING MECHANISM
Moscow K. Richmond, 2819 Butler Ave.,
Los Angeles 64, Calif.
Filed May 10, 1962, Ser. No. 193,733
18 Claims. (Cl. 318—264)

This invention relates generally to a mechanism for sensing changes in the speed of a moving member and, particularly, to a rotary speed-change-sensing mechanism for sensing changes in the rotary speed of a rotating member.

Stated briefly, the invention provides a speed-change-sensing mechanism equipped with first and second independently rotatable members which are adapted to be normally driven in rotation in unison. The rotary speed of the first member provides a reference speed, while the rotary speed of the second member is adapted to be changed independently of the rotary speed of the first member.

Operatively connected with these members, respectively, are first and second movable fulcrums which rockably support an arm engaged by a third, stationary fulcrum and which are moved in unison, by rotation of said members in unison, in such a way as to rock said arm on its stationary fulcrum. If the relative rotary speed of the second member with respect to the first member is reduced, continued movement of the first fulcrum, operatively connected with the first member, rocks the lever on the second fulcrum out of engagement with the stationary fulcrum.

In the illustrative embodiments of the invention, the first fulcrum is driven in gyration by rotation of the first member. The second fulcrum is drivably connected by a slip coupling, such as a friction clutch, to the second member in such manner that rotation of the latter member in one direction exerts a force on the second fulcrum tending to rock the arm about the gyratory fulcrum and into engagement with the stationary fulcrum. During normal operation of the mechanism, then, with said members turning in unison, the force exerted on the second fulcrum yieldably retains the arm in contact with the stationary fulcrum so that the arm is rocked on the latter fulcrum by the gyratory motion of the gyratory fulcrum. During one-half of each gyration of the latter fulcrum, the second fulcrum is moved in one direction by the force exerted thereon by the rotating second chamber, while during the other half of each gyration of the gyratory fulcrum, the second fulcrum is moved in the opposite direction and against the latter force exerted thereon so that slippage occurs in the slip coupling between the second member and the second fulcrum.

From this discussion, it is obvious that during normal operation of the mechanism, the second fulcrum is oscillated in unison with gyration of the gyratory fulcrum, the oscillatory fulcrum being moved in one direction of its oscillation under the action of the force exerted on the latter fulcrum by the rotating second member and in the opposite direction of its oscillation under the action of the force exerted on the arm by the gyratory fulcrum.

Assume now that rotation of the second rotary member of the present mechanism is arrested just as the oscillatory fulcrum commences its half cycle of movement in the direction of the force exerted on the fulcrum by rotation of the second member or at some other point in this half cycle, while rotation of the first rotary member, and, hence, gyration of the gyratory fulcrum, is continued. Under these conditions, the oscillatory fulcrum becomes a stationary fulcrum on which the arm is rocked out of engagement with the first-mentioned stationary fulcrum by continued gyration of the gyratory fulcrum. If the rotary motion of the second rotary member is arrested during the other half cycle of movement of the oscillatory fulcrum, the motion of the gyratory fulcrum continues the movement of the oscillatory fulcrum to the end of the half cycle and then rocks the arm on the latter fulcrum out of engagement with the stationary fulcrum. Essentially the same actions as those described above will, of course, occur if the second rotary member is merely slowed rather than completely arrested.

In the present rotary speed-change-sensing mechanism, then, rocking of the arm out of engagement with the stationary fulcrum signals a reduction in the relative rotary speed of the second rotary member with respect to the first rotary member. An added feature of the illustrative embodiments of the invention resides in the provision of a second stationary fulcrum to permit either direction of rotation of the rotary members.

A typical application of the present rotary speed-change-sensing mechanism is sensing overloads in a mechanical power transmission system. In this case, the second rotary member of the mechanism comprises a rotary power transmission member to be operatively connected in the power transmission system in such a way that it is slowed or arrested by an overload in the system. The rocking motion of the arm of the speed-change-sensing mechanism which occurs in response to this slowing or arresting of the power transmission member can be utilized to effect a desired control function in the power transmission system.

In one illustrative form of the invention, for example, the arm actuates an electrical switch for deenergizing a reversible motor for driving the power transmission system and conditioning the motor for reverse rotation. In another illustrative form of the invention, the arm activates a control device for an internal combustion engine which drives the power transmission system in which the rotary power transmission member of the mechanism is connected. In a third illustrative form of the invention, the arm controls a rotary transmission. It will become evident as the description proceeds that the above represent only a few of the many different applications and modes of operation of the present mechanism.

The illustrative embodiments of the invention possess various features of construction and operation in addition to those mentioned above, such as a manual reset feature and a limit stop feature, which will become readily evident as the description proceeds.

In view of what has been said heretofore, it is evident that a general object of the invention is to provide a new and unique rotary speed-change-sensing mechanism for sensing changes in the rotary speed of a member.

Another object of the invention is to provide a mechanism of the character described which can be designed to perform any desired control functions in response to speed changes sensed by the mechanism.

Yet another object of the invention is to provide a rotary speed-change-sensing mechanism which can be utilized to sense overloads in power transmission systems.

A further object of the invention is to provide a mechanism of the character described for use in a mechanical power transmission system and having a unique limit stop feature for controlling the system in response to predetermined movement of a driven member of the system.

Yet a further object of the invention is to provide a mechanism of the character described which is relatively simple in construction, economical to manufacture, immune to malfunctioning, and otherwise ideally suited to its intended purposes.

Other objects, advantages, and features of the invention will become evident as the description proceeds.

Certain illustrative embodiments of the present invention will now be described in detail by reference to the attached drawings, wherein:

FIG. 1 is a side elevation of a portion of a mechanical power transmisison system embodying one form of the present rotary speed-change-sensing mechanism;

FIG. 2 is an enlarged section taken along line 2—2 in FIG. 1 and illustrating the rotary speed-change-sensing mechanism embodied in the power transmission system of FIG. 1;

FIG. 3 is a side elevation of the mechanism in FIG. 2 illustrating the parts thereof in one position of operation;

FIG. 4 is a section taken along line 4—4 in FIG. 3;

FIG. 5 is a view similar to FIG. 3 showing the parts of the mechanism in another position of operation;

FIG. 6 is a view similar to FIGS. 3 and 5 illustrating the parts of the mechanism in yet another position of operation;

FIG. 7 is a side elevation of the rotary speed-change-sensing mechanism illustrated in FIGS. 1 and 2, on reduced scale, and showing a control circuit to be operated by the mechanism;

FIG. 8 is a side elevation of a modified form of the present rotary speed-change-sensing mechanism;

FIG. 9 is a side elevation of a further modified form of the present rotary speed-change-sensing mechanism;

FIG. 10 is a side elevation of yet a further modified form of the present rotary speed-change-sensing mechanism; and FIG. 11 illustrates an alternative electrical switching circuit for use with the present speed-change-sensing mechanism in place of the switching circuit of FIG. 7.

In FIGS. 1–7, the present rotary speed-change mechanism is designated by numeral 20. This mechanism includes a central shaft 22 driven in rotation from a reversible motor 24 through a speed reduction unit 26. Fixed to the shaft 22, as by a pin 28, is a first rotary member or disc 30. Rotatable on the shaft 22, next to the member 30, is a second rotary disc or power transmission member 32. Member 32 has been illustrated as comprising a grooved pulley, around which is trained a belt 34. Obviously a cable, chain, or other similar drive could be used in place of the illustrated belt drive. Fixed to one of the members 30 or 32, say member 30, is a disc 36 of friction material which, as will be seen, forms a slip or friction coupling between the members 30 and 32.

Power transmission member 32 includes an integral hub 38 on which is rotatable a third disc or rotary member 40. Disposed between and fixed to one of the members 30 or 40, say member 40, is a disc 42 of friction material. Threaded on the hub 38 of the member 32 is a nut 43. Conical springs 44 are mounted on the hub 38 between the member 40 and the nut 43. Springs 44, therefore, resiliently urge the member 40 toward the power transmission member 32 and, thereby, urge the friction disc 42 secured to the member 40 into frictional contact with the adjacent side face of the power transmission member 32. From this discussion, it is clear that the friction disc 42 forms a slip coupling between the members 32 and 40, whereby the member 40 is adapted to be driven in rotation by the member 32 and to slip with respect to the latter member.

Slidable on the shaft 22, outboard of the hub 38 of the power transmission member 32, is a gyratory fulcrum or eccentric 46. Fulcrum 46 is keyed against rotation on the shaft 22 by means of a pin 48 on the fulcrum engaging in a slot 50 in the shaft 22.

The outer end of shaft 22 is threaded to receive a nut 52. Mounted on the shaft 22, between the fulcrum 46 and the nut 52, is a multiplicity of spring washers 54. These spring washers urge the fulcrum 46 against the hub 38 of the power transmission member 32 and, thereby, the latter member against the friction disc 36 secured to the member 30. From this description, it is evident that the friction disc 36 provides a slip or friction coupling between the member 30 and the power transmission member 32, whereby the latter member is adapted to be driven in rotation by the member 30, and, therefore, the shaft 22, and to slip with respect to the member 30 and the shaft 22.

Carried on the member 40 is a shoulder screw 56 which functions as, and will hereinafter be referred to as, an oscillatory fulcrum. Rockably supported on the fulcrums 46 and 56 is an arm 58. Thus, arm 58 has a bore 60 which receives the shoulder of the screw or oscillatory fulcrum 56 with a close, but rotatable fit so that the arm 58 is pivotally or rockably supported on the member 40 by the fulcrum 56. Also, the arm 58 has a rectangular opening or slot 62 to receive the eccentric or gyratory fulcrum 46. This latter fulcrum has a peripheral groove 64 in which the upper and lower edges of the arm opening 62 engage. The spacing between the upper and lower edges of the opening 62 in the arm is approximately the same as the diameter of the bottom of the fulcrum groove 64 while the larger dimension of the arm opening is somewhat greater than this diameter.

From the preceding description, it is evident that if the oscillatory fulcrum 56 is stationary, rotation or gyratory motion of the eccentric or gyratory fulcrum 46 rocks the arm 58 on the fulcrum 56. Similarly, the force or torque exerted on the member 40, through the slip coupling 42, during rotation of the power transmission member 32 tends to rock the arm 58 on the gyratory fulcrum 46 in one direction or the other depending upon the direction of rotation of the member 32.

Stationarily mounted at the left-hand end of the arm 58, as the mechanism is viewed in the drawings, is an upstanding bracket 66 having an integral element 68 thereof bent into parallelism with the arm 58. The left-hand end of the arm is bent at right angles and formed with a slot 70, the upper and lower edges 72 and 74 of which straddle the bracket element 68. It will be observed that if the left-hand end of the arm 58 is rocked downwardly about the gyratory fulcrum 46, as the arm is viewed in FIGS. 1 and 4, the upper edge 72 of the slot 70 in the arm engages the upper edge 76 of the bracket element 68. Similarly, if the left-hand end of the arm 58 is rocked upwardly, the lower edge 74 of the slot 70 in the arm engages the lower edge 78 of the bracket element 68.

Now assume that the motor 24 is energized to drive the shaft 22 in the clockwise direction as it is viewed in FIG. 1. Clockwise rotation of the shaft 22 drives the power transmission member 32 in the clockwise direction, by virtue of the slip or friction coupling 36 between this member and the member 30 fixed to the shaft. Clockwise rotation of the power transmission member 32, in turn, transmits a clockwise torque to the member 40, and the oscillatory fulcrum 56 carried thereon, by virtue of the slip or friction coupling 42 between the latter members. This clockwise torque or force on the oscillatory fulcrum 56 rocks the arm 58 on the gyratory fulcrum 46 in the clockwise direction until the lower edge 74 of the slot 70 in the arm engages the lower edge 78 of the bracket element 68. The gyratory fulcrum 46, of course, is rotated or gyrated by rotation of the shaft 22. It will be evident that during one-half of each revolution or gyration of the fulcrum 46, the right-hand end of the arm 58 and, therefore, the oscillatory fulcrum 56 are permitted to descend (FIG. 3) under the action of the force or torque exerted on the fulcrum 56 by the slip coupling 42 between the members 32 and 40. The downward force on the fulcrum 56, of course, constantly urges the arm 58 in the clockwise direction on the gyratory fulcrum 46 to maintain the lower edge 74 of the arm slot 70 in contact with the lower edge 78 of the bracket element 68 during downward movement of the right-hand end of the arm 58 and the fulcrum 56. Accordingly, the arm 58 rocks on the lower edge 78 of the bracket element 68 and about the edge 74 of the arm during this downward movement of the fulcrum 56 and the right-hand end of the arm 58. During the remaining half of each revolution or gyration of the gyratory fulcrum 46, the latter elevates (FIG. 5) the right-hand end of the arm 58 and the oscillatory fulcrum 56. During this upward movement of the fulcrum 56, the member 32 continues to be driven in the clockwise direction of rotation by the shaft 22 so that the slip coupling 42 between the members 32 and 40 slips. In other words, during upward movement of the right-hand end of the arm 58 and the fulcrum 56, by the motion of the gyratory fulcrum 46, the member 40 slips with respect to the member 32 and is rotated with respect to the latter member in a direction opposing the direction of rotation of the latter member. During the upward motion of the right-hand end of the arm 58 and the fulcrum 56, of course, the torque transmitted from the clockwise rotating member 32 to the member 40 continues to exert a downward force on the fulcrum 56 which maintains the lower edge 74 of the arm slot 70 in contact with the lower edge 78 of the bracket element 68. Accordingly, here, again, the arm 58 is rocked on the lower edge 78 of the bracket element 68 and about the edge 74 of the arm.

It is evident, therefore, that during clockwise rotation of the shaft 22, the arm 58 is caused to rock on the lower edge 78 of the bracket element 68 by the combined action of the gyration of the gyratory fulcrum 46 and the continuous downward force which is exerted on the oscillatory fulcrum 56. The lower edge 78 of the bracket element 68, therefore, provides a stationary fulcrum for the arm 58. It is also clear that during the above-described rocking of the arm 58 on the stationary fulcrum 78, the fulcrum 56 is oscillated up and down about the axis of the shaft 22, the latter fulcrum being moved in one direction of its oscillation by the torque or force transmitted from the rotating member 32 to the member 40 and in the opposite direction of its oscillation by the force transmitted from the gyratory fulcrum 46 through the arm 58 to the fulcrum 56.

If the shaft 22 is rotated in the opposite direction, i.e., the counterclockwise direction as it is viewed in FIG. 1, the left-hand end of the arm is rocked downwardly, by the then upward force on the fulcrum 56, until the upper edge 72 of the arm slot 70 engages the upper edge 76 of the bracket element 68. The arm is caused to rock on this upper edge of the bracket element by the combined action of the gyration of the gyratory fulcrum 46 and the continuous upward force on the oscillatory fulcrum 56. As before, the latter fulcrum is simultaneously oscillated. In this case, then, the upper edge 76 of the bracket element 68 provides a stationary fulcrum for the arm 58 on which the latter is rocked during counterclockwise rotation of the shaft 22.

Assume now that as the shaft 22 is being driven in either direction of rotation by its motor 24, say in the clockwise direction, the member 32 is suddenly restrained against rotation with the shaft just as the fulcrum 56 commences its downward movement or at some point in this downward movement. When this occurs, the member 30 continues to rotate with the shaft and slippage occurs in the slip coupling 36 between the member 30 and the member 32. With the member 32 thus arrested, the downward bias force normally exerted on the oscillatory fulcrum 56 during rotation of the member 32 with the shaft 22 ceases. The slip coupling 42 between the now stationary member 32 and the member 40 resists relative rotation of members 32 and 40 and, therefore, movement of the fulcrum 56 in either direction of its oscillation. The gyratory fulcrum 46, of course, continues to be driven in gyration by the continuously rotating shaft 22. It is evident that continued gyration of the gyratory fulcrum 46 with the downward bias force on the oscillatory fulcrum 56 thus removed and with downward movement of the latter fulcrum thus resisted rocks the arm 58 on the oscillatory fulcrum 56 (FIG. 6) in a direction to move the left-hand end of the arm downwardly out of engagement with the stationary fulcrum 78 engaged by the arm during normal clockwise rotation of the member 32 with the shaft 22. Sufficient rocking of the arm 58 in this direction on the oscillatory fulcrum 56, of course, will result in engagement of the arm with the upper stationary fulcrum 76.

Assume now that the member 32 is arrested during clockwise rotation thereof and just as the oscillatory fulcrum 56 commences its upward movement or at some point in this upward movement of the latter fulcrum. As just noted, when the member 32 is held stationary, the slip coupling 42 resists upward movement of the fulcrum 56. This resistance to upward movement of the fulcrum 56 creates a downward force on the latter fulcrum during continued gyration of the fulcrum 46 which retains the arm 58 in contact with the lower stationary fulcrum 78. As a result, gyration of the gyratory fulcrum 46 continues to rock the arm on the lower stationary fulcrum 78 and move the fulcrum 56 upwardly until the latter reaches the upper limit of its oscillation. Fulcrum 56 then remains stationary at this upper limit. Continued gyration of fulcrum 46 rocks the arm 58 on the now stationary oscillatory fulcrum out of engagement with the lower stationary fulcrum 78 in precisely the same way as just described.

If the member 32 is arrested when the shaft 22 is being driven in the counterclockwise direction, essentially the same actions occur in the mechanism as those described above except that the various movements which take place in the mechanism when the member 32 is arrested occur in one direction when the shaft 22 rotates in the clockwise direction and in the opposite direction when the shaft 22 rotates in the counterclockwise direction. Thus, if the member 32 is arrested during counterclockwise rotation of the shaft 22, the arm 58 is rocked on the stationary oscillatory fulcrum 56 out of engagement with the upper stationary fulcrum 76, engaged by the arm during normal counterclockwise rotation of the member 32, and into engagement with the lower stationary fulcrum 78.

From the preceding discussion, it is evident that when the shaft 22 is driven in either direction of rotation by its motor 24 and the member 32 is free to rotate with the shaft, the arm 58 is rocked on either the upper stationary fulcrum or the lower stationary fulcrum 78, depending upon the direction of rotation of the shaft, and the oscillatory fulcrum 56 is oscillated up and down. If the member 32 is suddenly restrained against rotation with the shaft 22 rotating in either direction, the arm 58 is rocked on the then stationary oscillatory fulcrum 56 out of engagement with its currently engaged stationary fulcrum 76 or 78, as the case may be, and into engagement with the other stationary fulcrum. Arresting of the member 32 while the oscillatory fulcrum 56 is moving in the direction of rotation of the shaft 22 results in immediate rocking of the arm 58 in the manner described. On the other hand, arresting of the member 32 while the oscillatory fulcrum 56 is being moved in a direction opposite to the direction of rotation of the shaft 22 results in continued movement of the oscillatory fulcrum to the limit of its oscillation in this direction and then in rocking of the arm 58 in the manner described.

In the foregoing discussion, it has been assumed that the rotary motion of the member 32 is completely arrested. It is obvious, however, that essentially the same actions will occur in the rotary speed-change-sensing mechanism if the rotary speed of the member 32 is merely reduced. In this case, of course, the oscillatory fulcrum 56 will continue to move at a reduced rate of speed. Continued gyration of the gyratory fulcrum 46 at its normal speed of gyration, however, will cause rocking of the arm 58 on the slowly moving oscillatory fulcrum 56 in essentially the same way as described above where the rotary movement of the member 32 is completely arrested. If the rotary speed of the member 32 is reduced while the oscillatory fulcrum 56 is moving in the direction of rotation of the shaft 22, of course, the latter fulcrum will continue to be moved at its normal speed to the limit of its movement in this direction, whereupon it commences movement in the opposite direction at a reduced speed and the arm 58 is rocked on the slowly moving oscilliatory fulcrum by gyration of the gyratory fulcrum 46.

From the discussion thus far, it is evident that rocking of the arm 58 on one or the other of the stationary fulcrums 76 or 78, depending upon the direction of rotation of the shaft 22, signals or indicates that the member 32 is rotating in unison with the shaft 22 and at the same speed as the shaft. Rocking of the arm 58 on the oscilatory fulcrum 56 out of engagement with one of the stationary fulcrums 76 or 78 and into engagement with the other stationary fulcrum signals or indicates a reduction in the rotary speed of or complete arresting of the member 32. Clearly, then, the mechanism described above is adapted to sense a change in the rotary speed of the member 32. In the described mechanism, the gyratory speed of the gyratory fulcrum 46 actually serves as a reference speed and the mechanism senses a deviation of the relative speed of the member 32 with respect to the gyratory speed of the fulcrum 46 from a predetermined normal relative speed. Thus, if the motor 24 is alternately started and stopped, the rotary speed of the shaft 22, and, therefore, the "reference" gyratory speed of the gyratory fulcrum 46, changes. The rotary speed-change mechanism, however, will continue to function normally so long as the member 32 continues to rotate in unison with gyration of the gyratory fulcrum, or, in other words, so long as the relative rotary speed of the member 32 with respect to the gyratory speed of the fulcrum 46 remains constant. It is, therefore, the relative speed of the member 32 and the fulcrum 46, and not the absolute speed of these parts, which controls the operation of the mechanism.

In a typical application of the rotary speed-change-sensing mechanism described above, the belt 34 is trained about a second pulley (not shown) in a power transmission system so that the torque for driving the system is transmitted through the rotary power transmission member 32 of the mechanism 20. The tension of the springs 54 of the mechanism 20 is so adjusted, by positioning of the nut 52, that the torque required to cause slippage of the slip coupling 36 between the members 30 and 32 and, thereby, relative rotation of these members is slightly greater than the torque which is required to be transmitted from the member 30 to the member 32 to drive the power transmission system during normal loading thereof. When the load on the power transmission system is normal, or less than normal, therefore, the rotary power transmission member 32 of the present mechanism 20 is driven in unison with the gyratory fulcrum 46. Under these conditions, arm 58 of the mechanism 20 is rocked on one or the other of the stationary fulcrums 76 or 78, depending upon the direction of rotation of the shaft 22 of the mechanism. In the event of an overload in the power transmission system that requires a greater input torque than the slip coupling 36 can transmit without slippage, the rotary power transmission member 32 of the mechanism 20 is restrained against rotation in unison with the gyratory motion of the gyratory fulcrum 46. Under these conditions, the arm 58 of the mechanism is rocked on the oscillatory fulcrum 56 out of engagement with the stationary fulcrum 76 or 78 previously engaged by the arm.

This rocking of the arm 58 which occurs in response to an overload in the power transmission system and the attendant change in the relative rotary speed of the rotary power transmission member 32 with respect to the gyratory speed of the gyratory fulcrum 46 can be used to perform any desired control function. In the drawings, for example, this rocking of the arm is utilized to deenergize the motor 24 for driving the mechanism 20 and the power transmission system.

To this end, there is mounted on the upstanding bracket 66 an electrical toggle switch 80, the toggle arm 82 of which extends through a reduced continuation 84 of the slot 70 in the bent left-hand end of the arm 58. The slots 70 and 84, and the width of the stationary fulcrum forming element 68 of the bracket 66, are so proportioned that the switch arm 82 is operated to one position by movement of the left-hand end of the arm 58 between its upper position in which it engages the lower stationary fulcrum 78 and its lower position in which the arm engages the upper stationary fulcrum 76. Similarly, the switch arm 82 is operated to its other position by movement of the left-hand end of the arm 58 between its lower position of engagement with the upper stationary fulcrum 76 and its upper position of engagement with the lower stationary fulcrum 78. Thus, during normal operation of the power transmission system with the shaft 22 turning in either direction of rotation, the arm 58 of the mechanism 20 rocks about one or the other of the stationary fulcrums 76 or 78 and the switch arm 82 remains in the corresponding position. When an overload occurs in the system, the arm 58 is rocked into engagement with the other stationary fulcrum, thereby operating the switch arm 82 from one position to the other. This operation of the switch 80, for example, could serve merely to deenergize the motor 24 and thereby stop operation of the power transmission system. In the drawings, however, switch 80 is shown in FIG. 7 to be a double pole, double throw switch, the terminals of which are connected to the stator winding 24S and the rotor winding 24R of the motor 24 in the manner illustrated in FIG. 7. Two other terminals of the switch 80 are connected to two terminals 86A, 86B of a latching relay 86, the blade terminal 86E of which is connected to one terminal 88 of an electrical power source 90. The remaining terminal of the switch 80 is connected to the other terminal 92 of the power source 90. The coil 86C of the relay 86 is connected to an electrical power source 94 through a push button 96. The latching relay 86 is a conventional latching relay having a movable blade or contact 86D which is alternately moved into and locked in engagement with the relay contacts 86A and 86B in responsive to successive energizing of the relay coil 86C. Thus, assuming that the relay contact 86D initially engages the relay contact 86A, the first closure of the push button 96 shifts the relay contact 86D to the other relay contact 86B. The following closure of the push button 96 returns the relay contact 86D to the relay contact 86A.

The motor 24 is energized to drive the rotary speed-change-sensing mechanism 20 and the power transmission system operated thereby by depressing the push button 96 to shift the relay contact 86D to that relay contact 86A or 86B which is currently connected in circuit with the motor stator and rotor windings 24S and 24R by the switch 80. In the illustrated condition of the switch 80, for example, relay contact 86A is connected in circuit with the motor windings. Operation of the push button 96 to shift the relay contact 86D to the relay contact 86A, then, energizes the motor 24 to drive the mechanism 20 and the power transmission system operated thereby. So long as the load on the system is normal or below normal, the arm 58 of the mechanism 20 will continue to rock about the respective stationary fulcrum 76 or 78 and the switch arm 82 will remain in its current position. If an overload occurs in the power transmission system, the switch arm 82 is tripped by the arm 58 of the mechanism 20, in the manner described earlier. Tripping of the switch arm 82 operates the switch 80 to reverse the switch connections of the stator 24S of the motor 24 and place the motor windings 24S and 24R in circuit with the currently open relay contact 86B. The motor is thereby deenergized and conditioned for rotation in the reverse direction upon subsequent closure of the push button 96. When the push button is again operated, the relay contact 86D is shifted to relay contact 86B to energize the motor 24 in the reverse direction. This arrangement is particularly useful in power transmission systems in which the latter must be "backed off" following an overload before the latter can be removed. The arrangement described above is suitable, for example, for a garage door operator in which overloads generally occur as a result of the door encountering an obstruction either while it is being closed or opened. In this latter application, it is evident that the present rotary speed-change-sensing mechanism 20 is capable of serving both as a limit switching device for shutting off the garage door operating motor in response to the door engaging stops in its fully opened and fully closed positions and as a safety switch for shutting off the garage door operating motor in the event the door encounters an obstruction, such as a person standing in the path of movement of the door.

It is evident that the rocking motion of the arm 58 of the present rotary speed-change-sensing mechanism 20 which occurs in response to an overload in the power transmission system operated by the mechanism can be utilized to perform control functions other than that described above. For example, the mechanism 20 can be used to drive an electrical generator for energizing a variable electrical load which may overload the generator, thereby creating a mechanical overload in the system which rocks the arm on the rotary speed-change-sensing mechanism in the manner described. In this case, the arm may operate a suitable electrical control device for reducing the load on the generator. In this respect, it will be noted that the shaft 22 and the gyratory fulcrum 46 of the mechanism 20 can continue to rotate even though the power transmission member 32 is restrained against rotation with the gyratory fulcrum. In this case, of course, the arm 58 of the mechanism will be oscillated back and forth between the stationary fulcrums 76 and 78 and the oscillatory fulcrum 56 of the mechanism will be oscillated back and forth between its limits of oscillation. As a result, if the gyration of the gyratory fulcrum of the mechanism is continued while the rotary power transmission mechanism 32 of the mechanism is restrained against rotation, as it is during an overload in the power transmission system which it drives, any control device operated by the arm would continue to be actuated back and forth between its two positions. This would necessitate a specially designed control device in those applications of the mechanism in which the arm of the mechanism operates to control the load on the power transmission system in some way without discontinuing the gyratory motion of the gyratory fulcrum 46. It is also apparent, however, that when the overload is removed, so that the rotary power transmission member 32 again rotates in unison with the gyratory fulcrum 46, normal operation of the mechanism is resumed.

In the drawings, the member 32 and the gyratory fulcrum 46 are both driven from the same power source. It is conceivable, however, that the member 32 may be driven by one power source and the gyratory fulcrum 46 by another power source in which case the rotary speed-change-sensing mechanism 20 of this invention may be used to sense changes in the relative speed of the one power source with respect to the other power source. The rocking motion of the arm 58 of the mechanism which would then occur in response to a reduction in the speed of the one power source with respect to the other power source could be utilized to actuate a control device for increasing the relative speed of the one power source to normal. In this situation, then, the present rotary speed-change-sensing mechanism would serve as a means for synchronizing the operation of the two power sources.

As shown in FIG. 7, a limit stop 97 may be attached to the belt 34 and the arm 58 of the rotary speed-change-sensing mechanism 20 may be provided with an inclined camming surface 98 to be engaged by this stop for rocking the arm 58 on the oscillatory fulcrum 46 of the mechanism, and thereby operating the switch arm 82, after predetermined travel of the belt. Thus, it will be observed in FIG. 7 that when the limit stop 97 engages the inclined surface 98 on the arm 58, the right-hand end of the latter is cammed upwardly to rock the arm about the oscillatory fulcrum 46 in a direction to actuate the switch arm 82. The arm 58 may have a second inclined surface 100 for engagement by the limit stop 97, or an additional limit stop on the belt 34, during operation of the mechanism in the reverse direction. The extended right-hand end of the arm 58 is also adapted to be grasped for manual operation of the switch 80 by manual rocking of the arm 58 on the oscillatory fulcrum 46. In this connection, it will be observed that if the right-hand end of the arm 58 is sufficiently laterally extended, the above-described limit stop actions will occur whether the right-hand end of the arm is being rocked up or down as the limit stop 97 approaches the arm.

In the rotary speed-change-sensing mechanism 20 described above, it is apparent that during normal operation, the arm 58 of the mechanism functions as a lever which is fulcrumed at one end (stationary fulcrum 76 or 78), which has a load applied to its other end (bias force on the oscillatory fulcrum 56), and which is moved by a force applied between its ends (gyratory fulcrum 46). This will be immediately recognized as the action of a third class lever. During an overload, the arm 58 again forms a lever which is fulcrumed at one end (oscillatory fulcrum 56), which has a load applied to its other end (the resistance of the switch arm 82), and which is moved by a force applied between its ends (gyratory fulcrum 46). Here, again, the arm 58 acts as a third class lever.

FIG. 8 illustrates a modified rotary speed-change mechanism 20A according to the invention. Mechanism 20A is identical to the earlier mechanism 20 except the oscillatory fulcrum 56 of the mechanism 20A is located between the gyratory fulcrum 46 and the stationary fulcrums 76, 78. Mechanism 20A also operates in substantially the same way as mechanism 20. Thus, during normal operation of mechanism 20A, i.e., during rotation of the rotary power transmission member 32 with shaft 22, arm 58A is rocked on one or the other of the stationary fulcrums 76 or 78, depending on the direction of rotation of the member 32, by the combined action of the gyratory motion of the gyratory fulcrum 46 and the bias force exerted on the oscillatory fulcrum 56 by virtue of the slip coupling (not shown in FIG. 8) between members 32 and 40. It is obvious that during such normal operation of mechanism 20A, arm 58A acts as a second class lever.

If member 32 is arrested, continued gyration of the gyratory fulcrum 46 rocks the arm 58A on the then stationary oscillatory fulcrum 56 and trips the switch 80, as before. In this case, the arm obviously acts as a first class lever. In the earlier mechanism 20, then, its arm 58 acts as a third class lever both during normal operation of the mechanism and when its rotary power transmission member 32 is arrested. In mechanism 20A, on the other hand, its arm 58A acts as a second class lever during normal operation of the mechanism and as a first class lever when the rotary power transmission member 32 of the latter mechanism is arrested.

In FIGS. 1–8, the shaft 22 of the present rotary speed-change-sensing mechanism actuates a switch and is directly coupled to the power source, or motor, for the power transmission system in which the mechanism is used. In this case, then, the mechanism is situated at the power input end of the system. In some cases, it may be desirable or necessary to have the mechanism actuate some other control device than a switch an/or to have the mechanism situated at some intermediate position in the system. FIG. 9 illustrates such an arrangement.

In this figure, the shaft 22 of the mechanism 20B, which is like the mechanism 20A of FIG. 8 except for the differences hereinafter noted, has a gear 200 keyed thereon.

This gear is driven in rotation, to drive the mechanism 20B, through a gear train 202. In FIG. 9, the rotary power transmission member 32B of the mechanism comprises a gear, instead of a pulley as in FIGS. 1–8. Gear 32B drives a second gear train 204. Gear trains 202 and 204, then, comprise a power transmission system having the present rotary speed-change-sensing mechanism 20B connected at an intermediate position therein.

The arm 58B of the mechanism 20B is somewhat longer than the arm in the mechanisms of FIGS. 1–8 and rotatably mounts a gear 206 of the gear train 202. Gear 206 is adapted to normally mesh with, and thereby drivably couple, two other gears 208 and 210 of the gear train 202. Gear 210 meshes with gear 200 on the shaft 22 of the mechanism 20B. Gear train 202 is driven from a power source (not shown) in such a way that the shaft 22 and, therefore, the gear 32B of the mechanism 20B are driven in the counterclockwise direction indicated in FIG. 9. During rotation of the gear 32B with the shaft 22, a downward force is exerted on the oscillatory fulcrum 56 of the mechanism which urges the gear 206 on the arm 58B downwardly, about the gyratory fulcrum 46, to retain the latter gear in meshing engagement with the gears 208 and 210. The gear train 202 is thereby rendered operative to drive the gear train 204 through the rotary speed-change-sensing mechanism 20B. The shaft 212 of the gear 206 forms a stationary fulcrum for the arm 58B about which the latter is rocked, by gyration of the gyratory fulcrum 46, during normal operation of the mechanism. The hole 60B in the arm 58B through which the oscillatory fulcrum 56 extends is elongated in the mechanism under consideration so that the oscillatory motion imparted to the fulcrum 56, about the axis of the shaft 22, during gyration of the fulcrum 46, does not tend to move the gear 206 back and forth.

When the portion of the power transmission system to the right of the mechanism 20B, i.e., gear train 204, is operating under normal load, the gear 206 is maintained in meshing engagement with the gears 208 and 210, whereby the gear train 204 is driven through the mechanism 20B, as just indicated. During this normal operation of the system, the arm 58B is rocked on the stationary fulcrum, or gear shaft 212. In the event of an overload in the gear train 204, or in a following portion of the power transmission system driven by the latter gear train, the gear 32B of the mechanism is slowed or completely arrested. The shaft 22, and, therefore, the gyratory fulcrum 46 of the mechanism, however, continues to be driven through the gear train 202. Continued gyration of the fulcrum 46 rocks the arm 58B on the oscillatory fulcrum 56, as in the previous forms of the invention, in a direction which disengages the gear 206 on the arm from the gears 208 and 210. The mechanism 20B and the gear train 204 then cease to be driven from the gear train 202. The power transmission system can be restarted, after removal of the overload, by manually rocking the arm 58B of the then stationary gyratory fulcrum 46 to re-engage the gear 206 on the arm with the gears 208 and 210.

In FIG. 10, the shaft 22 of the illustrated rotary speed-change-sensing mechanism 20C is driven from an internal combustion engine 300. In this case, the stationary fulcrum for the arm 58C of the mechanism is furnished by an arm 302 on the rotatable valve member 304 of a fuel shut-off valve 306 for the engine 300. The valve arm 302 engages in a slot 308 in the arm 58C of the mechanism. In this case, the shaft 22 and, therefore, the pulley 32 of the mechanism are driven in the clockwise direction indicated so that the left-hand end of the arm 58C is urged upwardly by the normally downward force on the oscillatory fulcrum 56 of the mechanism. Shut-off valve 306 for the engine 300 includes a stop 310 for limiting upward swinging of the valve arm 302 to the position illustrated.

From this description, it is evident that when the load on the power transmission system driven by the mechanism 20C through belt 34 is operating under normal load, the arm 58C is rocked on the valve arm 302 which, therefore, serves as a stationary fulcrum for the arm. The valve arm 302 is retained in its upper limiting position of FIG. 10, in which position the valve 306 is open to pass fuel to the combustion chamber of the engine 300. In the event of an overload in the power transmission system operated by the mechanism, the member or pulley 32 is slowed or completely arrested, as before. When this occurs, the left-hand end of the arm 58C is rocked downwardly, about the oscillatory fulcrum 56, by gyration of the gyratory fulcrum 46. The valve arm 302 is thereby swung downwardly, which action closes the fuel shut-off valve 306 and stops the engine 300. A latch 311 retains the valve in its closed position to prevent it from being reopened by the inertia of the engine.

It will be immediately evident, of course, that the engine 300 may be controlled, in response to rocking of the arm 58C, in other ways than that described above. The arm of the mechanism, for example, could operate a switch, in a manner similar to that described in connection with FIGS. 1–8, for opening the ignition system of the engine. In the alternative, the drive shaft (not shown) of the engine 300 may be drivably coupled to the shaft 22 of the rotary speed-change-sensing mechanism by a centrifugally actuated clutch (not shown), in which case the arm of the mechanism could operate a throttle for slowing the engine, and thereby causing disengagement of the centrifugal clutch in response to an overload.

In FIG. 11, numeral 400 denotes a double pole double throw switch having switch blades 402 and 404. Connected between these blades is the field winding 405 of the motor 24 which drives the speed-change-sensing mechanism 20 in FIG. 1. In this case, motor 24 is a series wound D.C. motor. Switch blades 402 and 404 are mechanically connected to an actuator 406. This actuator engages in the slot 84 in arm 58 of the speed-change-sensing mechanism 20 in a manner similar to the actuator 82 of the switch in FIG. 7 so that the switch 400 is operated between its two closed positions by rocking of the arm.

In one closed position of switch 400, switch blades 402 and 404 engage switch contacts 408 and 410, respectively. Contact 408 is connected to one fixed contact 412 of a conventional latching relay 414. The other fixed contact 416 of this relay connects to one electrical power input terminal 418 through an indicator light 420. The movable contact 422 of this relay is connected to the other power input terminal 424. The other contact 410 of the double pole, double throw switch 400 is connected to one terminal of the rotor winding 426 of motor 24. The other terminal of this winding is connected to the input terminal 418.

Switch 400 has a second pair of contacts 428 and 430 which are engaged by the switch blades 402 and 404, respectively, when the latter are shifted to their other closed position. Switch contact 428 is connected between the switch contact 410 and the adjacent end of the motor rotor winding 426, as shown. Switch contact 430 is located between the latching relay contact 416 and the input terminal 418, as shown.

In a lead 432 connected across the input terminals 418, 424 is the primary of a transformer 434. The secondary of this transformer is connected in series with the coil 436 of the latching relay 414 and a normally open push button switch 438. Latching relay 414 operates in the well-known way to shift its movable contact 422 into engagement with the fixed relay contacts 412 and 416 alternately in response to successive energizing of the relay coil 436. The relay coil can be energized, of course, by momentarily closing the push button switch 438.

It is evident from the preceding description that if the motor 24 of the speed-change-sensing mechanism 20 is driving in one direction in response to the double pole, double throw switch 400 occupying one closed position when an overload occurs, the latter switch is thrown to its other closed position by rocking of the arm 58 of the speed-change-sensing mechanism 20 in the manner described earlier. If we assume, for example, that the blades 402, 404 of switch 400 and the movable contact 422 of relay 414 are in their solid line positions of FIG. 11 when the overload occurs, the switch blades are thrown to their dotted line positions. The connections to the field winding 405 are thereby reversed and the motor is deenergized. When the push button switch 438 is closed to shift the movable relay contact 422 to its dotted line closed position, the motor is restarted in the reverse direction. Thus, the electrical switching circuit just described deenergizes the drive motor of the overload sensing device in response to an overload and simultaneously reconditions the motor for subsequent operation in the reverse direction.

While in the illustrated forms of the invention, friction clutches are used, it is obvious other types of slip clutches may be employed, such as magnetic clutches.

Clearly, then, various illustrative embodiments of the invention, fully capable of attaining the several objects and advantages preliminarily set forth, have been disclosed. These physical embodiments of the invention are, of course, intended to be purely illustrative and not limiting in nature, numerous modifications in the design, arrangement of parts, and instrumentalities of the invention being possible within the spirit and scope of the following claims.

What is claimed is:

1. In a rotary speed-change-sensing mechanism, the combination of:
    a pair of rotary members,
    an arm,
    a stationary fulcrum engaging said arm,
    a pair of independently movable fulcrums rockably supporting said arm and movable in unison to rock said arm on said stationary fulcrum, and
    means including slip coupling means associated with one of said fulcrums for drivingly connecting said fulcrums individually to said respective rotary members,
    the relative speed of movement of one of said movable fulcrums with respect to the other movable fulcrum being adapted to be changed, whereby movement of one movable fulcrum rocks said arm on the other movable fulcrum out of engagement with said stationary fulcrum.

2. In a rotary speed-change-sensing mechanism, the combination of:
    a pair of rotary members,
    a first gyratory fulcrum,
    a second oscillatory fulcrum,
    an arm rockably supported on said fulcrums,
    means including slip coupling means associated with one of said fulcrums for drivingly connecting said fulcrums individually to said respective rotary members,
    a stationary fulcrum engaging said arm,
    said first and second fulcrums being movable in unison to rock said arm on said stationary fulcrum, and
    the relative speed of movement of one of said first and second fulcrums with respect to the other of the latter fulcrums being adapted to be changed, whereby movement of one of said latter fulcrums rocks said arm on the other of the latter fulcrums out of engagement with said stationary fulcrum.

3. In a rotary speed-change-sensing mechanism, the combination of:
    a first gratory fulcrum,
    a first rotary member drivingly connected to said first fulcrum,
    a second oscillator fulcrum,
    a second rotary member,
    means providing a slip coupling between said second rotary member and said second fulcrum for urging the latter in one direction of its oscillation during rotation of said second rotary member in one direction,
    said slip coupling means being adapted to slip to permit movement of said second fulcrum in the other direction of its oscillation,
    an arm rockably supported on said fulcrums in such manner that the arm is adapted to be rocked on said second fulcrum by gyration of said first fulcrum and the force exerted on said second fulcrum by said second rotary member during rotation of the latter in said one direction tends to rock said arm in a given direction on said first fulcrum, and
    a third fulcrum engaging said arm to limit rocking of the latter in said given direction on said first fulcrum, whereby said arm is rocked on said third fulcrum and said second fulcrum is oscillated by gyration of said first fulcrum and rotation of said second rotary member in said one direction in unison, and said arm is rocked on said second fulcrum out of engagement with said third fulcrum by gyration of said first fulcrum during a reduction in the relative rotary speed of said second rotary member with respect to the gyratory speed of said first fulcrum.

4. In a rotary speed-change-sensing mechanism, the combination of:
    a first rotary member,
    a second rotary member,
    means providing a slip coupling between said members, whereby said second member is adapted to be driven in rotation by said first member and to slip with respect to said first member,
    a first gyratory fulcrum,
    means for rotating said gyratory fulcrum at a speed independent of the rotational speed of the first rotary member,
    a second oscillatory fulcrum carried on said second member for oscillatory movement with the latter member about its axis of rotation,
    an arm rockably supported on said fulcrums in such manner that said arm is adapted to be rocked on said second fulcrum by gyration of said first fulcrum and the torque exerted on said second member by said first member during rotation of the latter in one direction tends to rock said arm in a given direction on said first fulcrum, and
    a third fulcrum engaging said arm to limit rocking of the latter in said given direction on said first fulcrum, whereby said arm is rocked on said third fulcrum and said second fulcrum is oscillated by gyration of said first fulcrum and rotation of said first member in said one direction in unison, and said arm is rocked on said second fulcrum out of engagement with said third fulcrum by gyration of said first fulcrum during a reduction in the relative rotary speed of said first member with respect to the gyratory speed of said first fulcrum.

5. In a rotary speed-change-sensing mechanism, the combination of:
    a rotary shaft,
    a first member rotatable on said shaft,
    means providing a slip coupling between said shaft and member, whereby the latter is adapted to be driven in rotation by said shaft and to slip with respect to the shaft,
    a second member rotatable on said shaft,
    means providing a slip coupling between said members, whereby said second member is adapted to be driven in rotation by said first member and to slip with respect to said first member,
    a first gyratory fulcrum fixed to said shaft to turn with the latter, a second oscillatory fulcrum carried by said second member for oscillation with the latter member about said shaft, an arm rockably supported on said fulcrums in such a way that said arm is adapted to be rocked on said second fulcrum by gyration of said first fulcrum and the torque exerted on said second member by said first member during rotation of the latter member in one direction with said shaft tends to rock said arm in a given direction on said first fulcrum, and a third fulcrum engaging said arm to limit rocking of the latter in said given direction on said first fulcrum, whereby said arm is rocked on said third fulcrum and said second fulcrum is oscillated by rotation of said first member in said one direction with the shaft, and said arm is rocked on said second fulcrum out of engagement with said third fulcrum by rotation of said shaft with said first member restrained against rotation with the shaft.

6. In a rotary speed-change-sensing mechanism, the combination of:

a rotary shaft, a first disc fixed to said shaft, a second disc rotatable on said shaft, means for urging said discs into frictional contact, whereby said second disc is adapted to be driven in rotation by said first disc and to slip with respect to said first disc, a third disc rotatable on said shaft, means urging said third disc into frictional contact with said second disc, whereby said third disc is adapted to be driven in rotation by said second disc and to slip with respect to said second disc, an arm pivoted on said third disc, an eccentric fixed to said shaft and engaging in a slot in said arm, the torque exerted on said third disc by said second disc during rotation of the latter in one direction with said shaft tending to rock said arm in a given direction on said eccentric, and means engaging said arm to limit rocking of the latter on said eccentric.

7. In a rotary speed-change-sensing mechanism, the combination as in claim 6 in which the last-mentioned means comprises a pair of stationary fulcrums each engageable with said arm to limit rocking of the latter in opposite directions on said eccentric.

8. In a rotary speed-change-sensing mechanism, the combination of:

a first rotary power transmission member adapted to be driven in rotation, a second rotary member, means providing a slip coupling between said members, whereby said second member is adapted to be driven in rotation by said first member and to slip with respect to said first member, a first gyratory fulcrum, means for turning said gyratory fulcrum independently of the second rotary member, a second oscillatory fulcrum carried on said second member for oscillatory movement with the latter member about its axis of rotation, an arm rockably supported on said fulcrums in such manner that said arm is adapted to be rocked on said second fulcrum by gyration of said first fulcrum and the torque exerted on said second member by said first member during rotation of the latter in one direction tends to rock said arm in a given direction on said first fulcrum, and a stationary fulcrum engaging said arm to limit rocking of the latter in said given direction on said first fulcrum, whereby said arm is rocked on said stationary fulcrum and said second fulcrum is oscillated by gyration of said first fulcrum and rotation of said first member in said one direction in unison, and said arm is rocked on said second fulcrum out of engagement with said stationary fulcrum by gyration of said first fulcrum during a reduction in the relative rotary speed of said first member with respect to the gyratory speed of said first fulcrum.

9. In a rotary speed-change-sensing mechanism, the combination as in claim 8 which also includes drive means for driving said first fulcrum in gyration and said first member in rotation in such manner that the rotary speed of said first member is adapted to be reduced independently of the gyratory speed of said first fulcrum in response to an overload on the system, and control means operated by said arm upon rocking of the arm on said second fulcrum out of engagement with said stationary fulcrum for controlling said system.

10. In a rotary speed-change-sensing mechanism, the combination as in claim 8 which also includes means including a reversible power source for driving said first fulcrum in gyration and said first member in rotation in such manner that the rotary speed of said first member is adapted to be reduced independently of the gyratory speed of said first fulcrum, and means including a control device to be operated by said arm upon rocking of the arm on said fulcrum out of engagement with said stationary fulcrum for deactivating said power source and conditioning the latter for operation in the reverse direction.

11. In a rotary speed-change-sensing mechanism, the combination as in claim 8 which also comprises a control device to be operated by said arm upon rocking of the arm on said second fulcrum out of engagement with said stationary fulcrum.

12. In a rotary speed-change-sensing mechanism, the combination of:

a pair of rotary members, an arm, a stationary fulcrum engaging said arm, a pair of independently movable fulcrums rockably supporting said arm and movable in unison to rock said arm on said stationary fulcrum, means including slip coupling means associated with one of said fulcrums for drivingly connecting said fulcrums individually to said respective rotary members, the relative speed of movement of one of said movable fulcrums with respect to the other movable fulcrum being adapted to be changed, whereby movement of one movable fulcrum rocks said arm on the other movable fulcrum out of engagement with said stationary fulcrum, and a control device to be operated by said arm upon rocking of said arm out of engagement with said stationary fulcrum.

13. In a rotary speed-change-sensing mechanism, the combination of:

an arm, a stationary fulcrum engaging said arm, a pair of independently movable fulcrums rockably supporting said arm and movable in unison to rock said arm on said stationary fulcrum, the relative speed of movement of one of said movable fulcrums with respect to the other movable fulcrum being adapted to be changed, whereby movement of one movable fulcrum rocks said arm on the other movable fulcrum out of engagement with said stationary fulcrum, means for driving said pair of fulcrums, and means to be operated by said arm upon rocking of the latter out of engagement with said stationary fulcrum for controlling said driving means.

14. A rotary speed-change-sensing mechanism, comprising in combination:
a first rotary member,
a second rotary member,
means providing a slip coupling between said two rotary members for driving the second member from the first member while permitting the second member to slip with respect to the first member,
an arm,
means establishing a normally stationary axis about which the arm can rock, said axis being shiftable between two positions,
a pair of spaced, independently movable fulcrums rockably supporting said arm and movable in unison to rock said arm about said axis, one of said fulcrums providing a coupling between the first rotary member and the arm, and
means including the other one of said fulcrums providing a coupling between the second rotary member and the arm,
the relative speed of movement of the movable fulcrums with respect to each other being adapted to be changed whereby movement of one movable fulcrum rocks said arm about the other movable fulcrum to shift the position of said axis.

15. A rotary speed-change-sensing mechanism as in claim 14 in which the pair of movable fulcrums comprises:
an oscillatory fulcrum, and
a gyratory fulcrum providing said coupling between the arm and the rotary member.

16. A rotary speed-change-sensing mechanism, comprising in combination:
a first rotary member mounted to rotate about a first axis,
a second rotary member coaxial therewith,
means providing a slip coupling between said two rotary members for driving the second member from the first member while permitting the second member to slip with respect to the first member,
an arm,
means establishing a second normally stationary axis about which the arm can rock, said second axis being shiftable between two positions,
an oscillatory fulcrum oscillating about the first axis and a gyratory fulcrum turning about the first axis, said fulcrums being independently movable and rockably supporting said arm and being movable in unison to rock said arm about said second axis, said gyratory fulcrum providing a coupling between the first rotary member and the arm, and
means providing a slip coupling between the second rotary member and the other one of said fulcrums whereby rotation of the second rotary member biases the oscillatory fulcrum in a given direction yet permits movement of the oscillatory fulcrum independently of the second rotary member,
the relative speed of movement of the movable fulcrums with respect to each other being adapted to be changed whereby movement of one movable fulcrum rocks said arm about the other movable fulcrum to shift the position of said second axis.

17. In a rotary speed-change-sensing mechanism, the combination of:
a rotary shaft,
a first disc fixed to said shaft,
a second disc rotatable on said shaft,
first friction clutch means between said discs, whereby said second disc is adapted to be driven in rotation by said first disc and to slip with respect to said first disc,
a third disc rotatable on said shaft,
second friction clutch means between said third disc and said second disc, whereby said third disc is adapted to be driven in rotation by said second disc and to slip with respect to said second disc,
an arm,
a pivotal coupling between said arm and said third disc,
an eccentric fixed to and rotating with said shaft and engaging said arm to impart rocking motion to said arm,
the torque exerted on said third disc by said second disc during rotation of the latter in one direction with said shaft tending to rock said arm in a given direction about said eccentric, and
means establishing a normally stationary axis about which the arm is rocked by said eccentric, the stationary axis being shiftable between two positions by rocking motion of the arm about said pivotal coupling.

18. A rotary speed-change-sensing mechanism, comprising in combination:
a first rotary member,
a second rotary member,
means providing a slip coupling between said two rotary members for driving the second member from the first member while permitting the second member to slip with respect to the first member,
an arm,
means establishing a normally stationary axis about which the arm can rock, said axis being shiftable between two positions,
a pair of spaced, independently movable fulcrums rockably supporting said arm and movable in unison to rock said arm about said axis, one of said fulcrums providing a coupling between the first rotary member and the arm,
means including the other one of said fulcrums providing a coupling between the second rotary member and the arm,
the relative speed of movement of the movable fulcrums with respect to each other being adapted to be changed whereby movement of one movable fulcrum rocks said arm about the other movable fulcrum to shift the position of said axis,
motor means driving said rotary members, and
a control member operated by said arm upon shifting said axis between said two positions to control said motor means.

References Cited by the Examiner
UNITED STATES PATENTS
1,459,757    6/1923   Stevenson _____ 192—139

ORIS L. RADER, *Primary Examiner.*